Oct. 31, 1972  B. T. HILL, JR  3,701,596
PORTABLE DUAL MOTION PICTURE VIEWER
Filed Jan. 11, 1971  4 Sheets-Sheet 1

INVENTOR
BENJAMIN T. HILL, JR.
BY Harry R. Lubcke
AGENT

Oct. 31, 1972   B. T. HILL, JR   3,701,596
PORTABLE DUAL MOTION PICTURE VIEWER
Filed Jan. 11, 1971   4 Sheets-Sheet 3
FIG. 3.
FIG. 4.
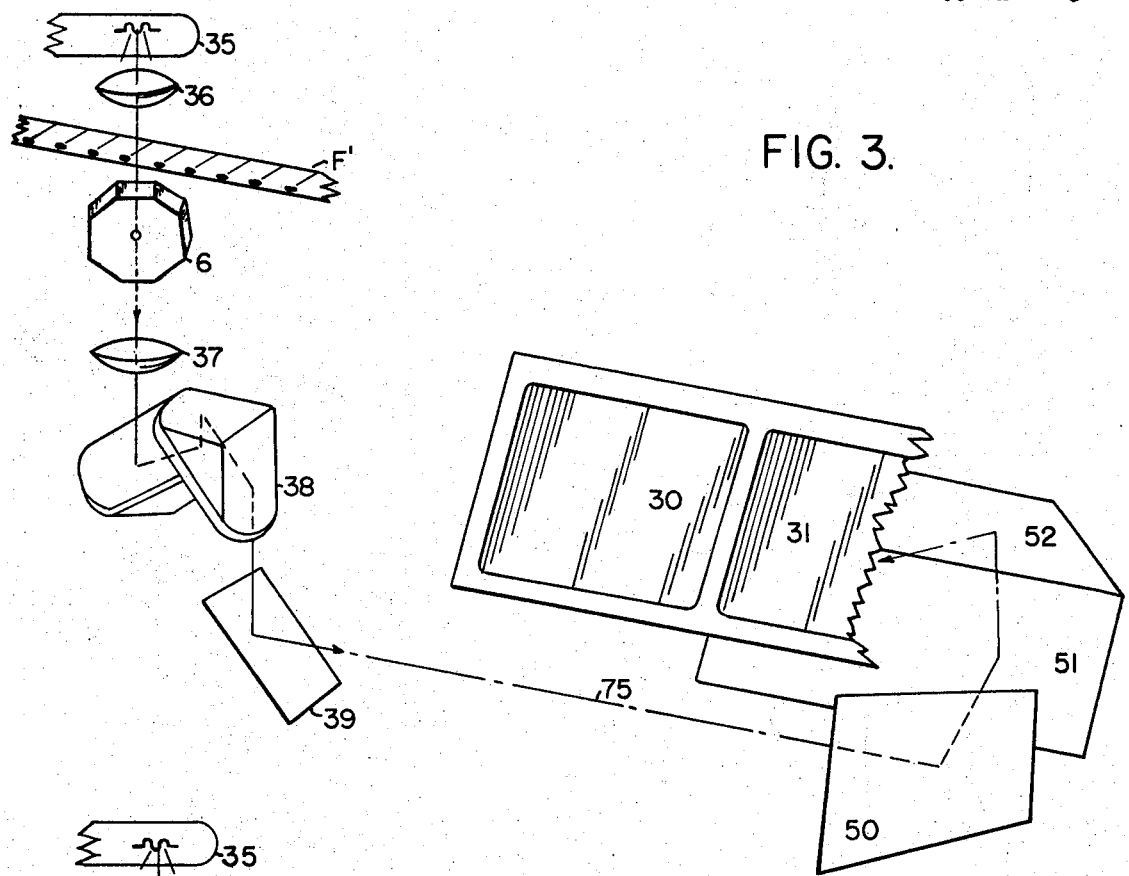
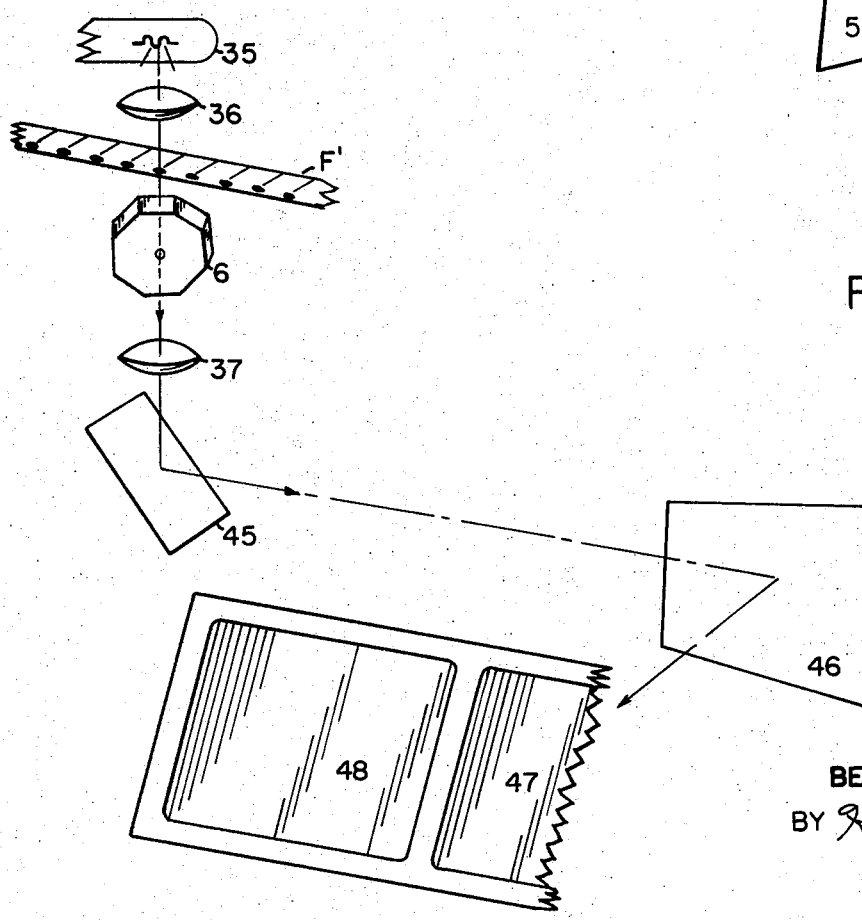
INVENTOR
BENJAMIN T. HILL, JR.
BY Harry R. Lubcke
AGENT Oct. 31, 1972     B. T. HILL, JR     3,701,596
PORTABLE DUAL MOTION PICTURE VIEWER
Filed Jan. 11, 1971     4 Sheets-Sheet 4

INVENTOR
BENJAMIN T. HILL, JR.
BY *Harry R. Lubcke*
AGENT

United States Patent Office 3,701,596
Patented Oct. 31, 1972

3,701,596
PORTABLE DUAL MOTION PICTURE VIEWER
Benjamin T. Hill, Jr., 6842 Ranchito Ave.,
Van Nuys, Calif. 91405
Filed Jan. 11, 1971, Ser. No. 105,293
Int. Cl. G03b 21/00
U.S. Cl. 352—129      6 Claims

ABSTRACT OF THE DISCLOSURE

A portable motion picture viewer for simultaneously and synchronously reproducing both sight and sound from typically two motion picture films. A dual lamphouse is pivoted to allow the films to be easily threaded. The films are aligned to allow easy editing. Manual advance of both films or reproduction at sound speed are available. Typically each film is exhibited on separate side-by-side screens, but the views may be super-imposed to accomplish dissolves. A modification provides three-dimensional viewing. A third sound track may be mixed-in.

BACKGROUND OF THE INVENTION

This invention pertains to film strip viewing apparatus.

The professional motion picture industry has employed non-portable motion picture viewers for film editing, such as the known "Moviola." These are typically a single-film sight-and-sound reproducer with a vertical film path. Multiple sprocket film-path "synchronizers" that are devoid of reproducing facilities are also used in professional film editing. These give essentially only a footage indication. The time required for such editing has not been crucial.

In another configuration for editing an image-producing viewer and a sound reader (reproducer) are employed one after the other along a film path by combining two separate pieces of apparatus.

Still further, sight-sound reproducers may be staggered, one film path with respect to the other, which makes the actual film cutting inconvenient. Therein, the films must be threaded beneath stationary lamphouses.

The inadequacies of these devices have taxed the skill of the film editor.

SUMMARY OF THE INVENTION

A synchronized presentation of the sight and sound of two films is almost mandatory for rapid film editing. This is because two motion picture cameras are frequently employed simultaneously.

In television newsreel work one camera is often directed to the news story while the other may be directed at the news correspondent narrating the story. If only one camera might be available it is used correspondingly so that there is a simultaneousness to the film product and the editor must make a choice at various times as to which picture and sound best tells the story.

In documentary and usual motion picture production two cameras may be employed with different focal length lenses or at different distances from the object of principal interest.

Accordingly, "A" and "B" rolls of film are either available as shot or are made up by the editor so that he can see the choice he has for each sequence of what becomes the final film.

In the subject viewer the main drive sprockets, the optical take-offs, and the sound heads for the two films are aligned. Thus, corresponding frames on each film are directly opposite each other and editing is easy and rapid.

A pivoted dual lamphouse illuminates the picture part of each film. It swivels (retracts) away from the film paths for rapid threading and removal of the films during the editing process.

Folded dual optical systems provide compact optical paths for side-by-side viewing at a convenient location upon the viewer structure.

An adjustment allows both images to be exhibited on one screen for superimposition viewing. In an alternate embodiment three-dimensional ("3D") images may be superimposed for 3D viewing.

Despite the compact structure of the viewer the sound reproducing heads are disposed the required distance along the film path from the optical take-off to give synchronized sight and sound.

The subject viewer is self-contained in one apparatus-type suitcase. It is therefore portable and may be used away from established facilities.

BRIEF DESCRIPTION OF THE DRAWINGS

FIG. 3 is a schematic showing of one of the dual picture optical systems.

FIG. 4 is a similar showing for an alternate embodiment in which the viewing screens are located low at the front rather than high at the back of the viewer structure.

DESCRIPTION OF THE PREFERRED EMBODIMENTS

Figure 1:
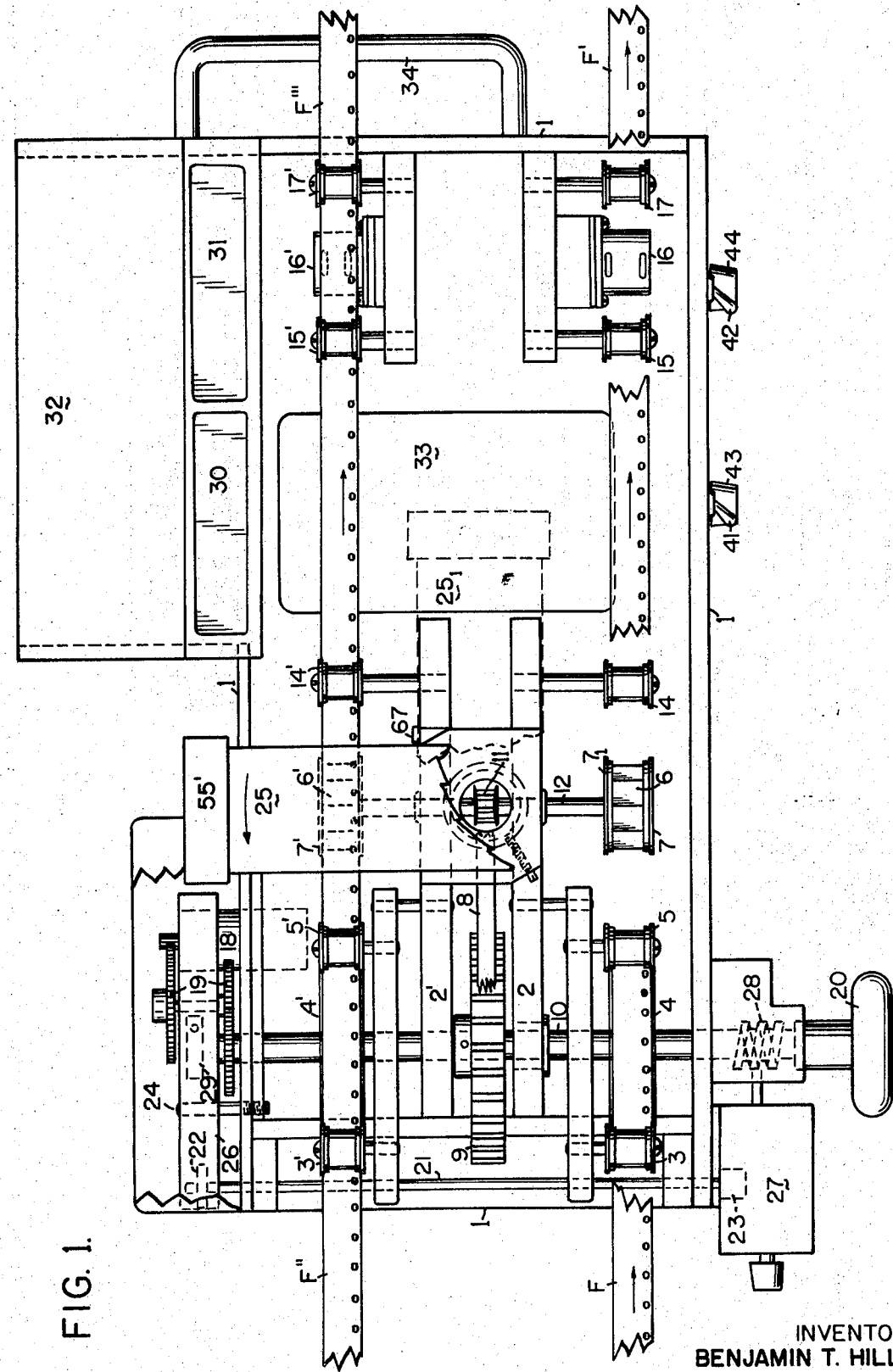
FIG. 1 is a plan view of the viewer. The lamphouse is shown in its operating position and dotted in its retracted position.

In FIG. 1 numeral 1 indicates a rectangular supporting and quasi-enclosing case. This is formed of rigid material, such as metal or a structurally rigid plastic, having a thickness of an appreciable fraction of an inch. Essential mechanical elements are disposed on an inner metal frame 2, 2'. Other elements requiring only nominal rigidity are fastened elsewhere to the case.

The forward film path is identified as F, F'; the film entering at F and leaving at F'. The film can be taken from the known cutting-room canvas film bins and discharged into another one after suitable pull-through driving means are employed. Otherwise, it can be taken from a known rewind reel device and wound upon another one after passing through the subject viewer.

Typically, a pair of rewinds are employed for take-up. These are spaced apart the distance between the two film paths in the viewer and are mechanically coupled by a differential spacer. This is driven from the manual crank of the rewind through internal gears, and operates as does an automobile differential. The effect here is that the film with the least tension experiences the greatest turning moment, and so both films are automatically pulled through in step. This is supplementary to the rigid synchronism provided by the main drive sprockets of the viewer, to be hereinafter described. Since these film handling means external to the viewer are known they have not been shown.

The incoming film in both paths first encounters first film guide roller 3. This is a known flanged roller, relieved in the center to prevent scratching the film, since the film is run through the viewer in projection position. It bears with spring tension upon large sprocket 4. Since one foot of 16 mm. film has forty frames and forty sprocket holes a forty-tooth sprocket is preferred for sprocket 4. One revolution of the same thus translates one foot of film. Second film guide roller 5 similarly engages film F as it leaves sprocket 4 after about 90° engagement thereon.

The film next passes over rotating prism 6, which has a plurality of faces arranged in a circumference and flanges 7, 7₁ on each side. This known element provides a stationary image from light that has passed through the translating film. A prism having eight faces must revolve 5 times as rapidly as does sprocket 4. A suitable drive is provided by toothed belt 8. Toothed pulley 9 is mounted upon shaft 10, which also carries sprockets 4 and 4'. Toothed pulley 11 is mounted upon shaft 12, which also carries rotating prisms 6 and 6'. Toothed pulley 9 has 5 times as many teeth as toothed pulley 11, thus the speed step-up required is obtained.

Precise workmanship is employed in the sprocket-rotating prism assembly; ball bearings for the shafts of ABECA 7 or better designation, runout of the shafts held to 0.0005 inch, and means provided to tighten belt 8 to avoid any slack in this drive member. Such precision results in minimal jump and weave of the reproduced picture. A magnification of ten times is employed in the optical system, from film to screen, and any mechanical irregularities are amplified by that ratio on the screen. The structure of this viewed is, however, such as to provide a satisfactorily steady picture. The machining techniques, details of fitting ball bearings in frames 2, 2', tightening belt 8, and spring-loading rollers 3 and 5 are known and so are not recited herein.

Third guide roller 14 is spaced beyond rotating prism 6 in alignment along the film path F, F', a distance approximately equal to the distance from second guide roller 5 to the prism. At substantially three times this distance fourth guide roller 15 is located. The latter roller is the first of two coacting with sound-head assembly 16, which head is typically of the magnetic type. The second coacting guide roller is the fifth of the path 17. From this roller the film departs to the previously mentioned take-up facilities.

At the election of the film editor shaft 10 is driven by small synchronous motor 18, having about one inch-ounce torque, and an intervening speed reduction gear train 19. This gives a speed of 36 revolutions per minute to the shaft and an enhancement of the torque of about twenty times. These figures are for the forty-frame sprocket 4 shown, and would be proportional for any fewer or greater number of frames around the circumference of the sprocket.

The motor-gear elements are at the left-rear of case 1. At a forward extension of shaft 10 handwheel 20 is attached so that manual progression of the film can be accomplished when desired.

It is necessary that the gear train be disconnected from shaft 10 when the handwheel is used. This is accomplished by mounting the motor-gear elements as a unit on frame 26 upon stub shaft 24 that is fastened to case 1. Cam spindle 21 extends through the front and back surfaces of case 1, with cam 22 at the rear and knob 23 at the front. By manually rotating the cam spindle 90° the gear upon spindle 10 is either engaged to the rest of the gear train, or it is disengaged. The cam bears upon and thus rotates frame 26 about stub shaft 24 to accomplish this. Microswitch 29 is disposed in relation to frame 26 to start motor 18 automatically when the gears are engaged.

Illumination is provided for separate optical paths for each of the pair of films by swivel lamphouse 25. In FIG. 1 the full-line representation of the lamphouse shows the operating position, while the dotted line 25₁ representation thereof shows the films threading position. The forward half of the lamphouse has been broken away in FIG. 1 to clearly show the forward film path. The operating position places the lamphouse directly over both of the rotating prisms involved and in the latter, threading, position the lamphouse is 90° removed from the operating position, lying longitudinally of the major dimension of case 1. Details of the full lamphouse and its swivel mounting are given in FIG. 5, to the later described.

A known counter 27, calibrated in footage of film or the equivalent playing time of the film at synchronous speed, is mounted on the front face of case 1. It is in geared relation to shaft 10, typically to a worm gear 28 on that shaft.

Viewing screens 30 and 31 are shown side by side at the rear of case 1 in foreshortened aspect in FIG. 1. These are normally of acrylic plastic, with one side ground to a matte finish in the same manner as ground glass screens are formed. Inclosure 32, suffixed behind case 1 proper, provides a light-tight space in which elements of the optical systems further shown in FIG. 4 are housed.

Centrally located on the upper surface of case 1 is speaker grille 33. Below the same is a five-inch loudspeaker and known amplifying apparatus to provide aural reproduction and sound mixing from either or both of the films as these pass head 16 and companion head 16' of the second film path.

The second film path F''–F''' is a duplicate of the path that has been described. It is located parallel to the first film path, but near the rear of case 1, whereas the first film path is located near the front of case 1. The corresponding elements have the same numbers, but with those of the rear film path additionally designated by primes (').

A carrying handle 34 is attached to the right-hand end of case 1 as an aid to portability. It has been found that the degree of ruggedness required to withstand external air shipping conditions is extreme. Consequently, a heavy outer apparatus case with cushioned fitments to secure the viewer within it as a whole, including the handle, is provided. This outer case has not been shown.

Figure 2:
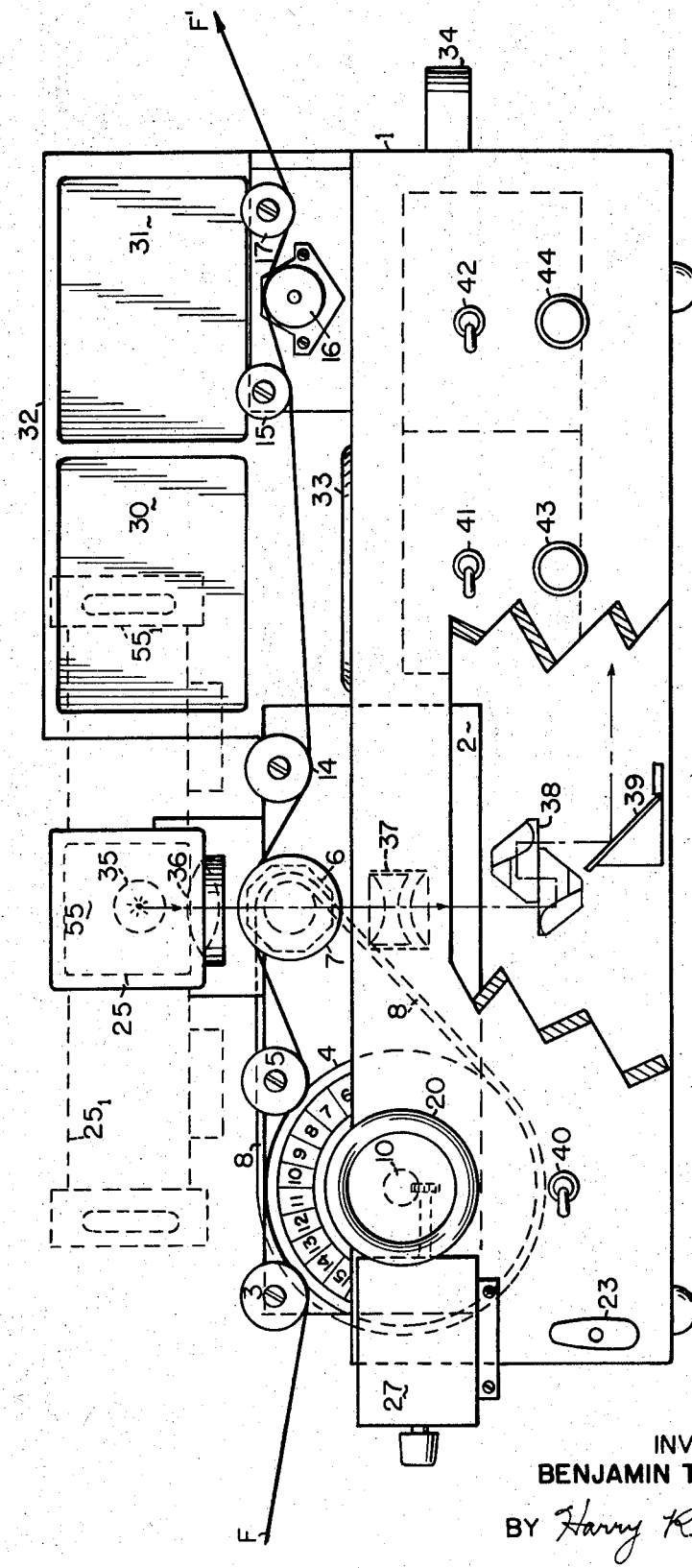
FIG. 2 is a front elevation view of the viewer.

FIG. 2 is the front elevation view of the viewer. Elements previously identified in FIG. 1 have the same reference numerals in FIG. 2. The path of the forward film, with film F–F' therein, is seen in FIG. 2. It passes under roller 3, over and around toothed sprocket 4, under roller 5, over rotating prism 6, under roller 14, under roller 15, over sound head 16 and under roller 17.

A significant portion of the real optical system of the forward film path is shown in FIG. 2. Projection lamp 35 originates the light for the projection of the film image on screen 30. Positive (converging) condenser lens 36 collects as much light flux as possible from the lamp source and spreads it at an even intensity over the area of approximately three frames of film F–F' as it passes over rotating prism 6. The light which passes through the film also passes through the prism. Condenser lens 36 actually images the light source filament at the first air-glass surface of projection lens 37, the next optical element in line. The image is such that it fills the lens with light, as it were. If the "image" of the filament is too small or too large the system is inefficiently constituted. The rays of light from the condensing lens to the projection lens are therefore slightly converging.

Projection lens 37 is, of course, on the optical axis defined by the previously recited elements. It is typically a triplet type lens of 50 mm. focal length, having a speed of $f3.5$, or faster. Closely below this lens and with a horizontal incident face lies shelf prism 38, for which an Amici type prism may be substituted if desired. These are known internally reflecting prisms which both invert and revert the image, so that an erect and correct right-to-left projection will appear on the projection screen (from behind). With the shelf prism the emerging image-carrying rays exit from the prism vertically downward, but displaced laterally to the right from the prior optical axis. They impinge upon first-surface mirror 39. This is inclined 45° to the vertical and so reflects the rays essentially horizontally to the right where further mirrors reflect the rays to the viewing screen. The remainder of this optical system is shown in FIG. 4.

Upon the front panel of the viewer, to the left, power switch 40 controls the "on" and "off" of all the electric power used in the apparatus. Knob 23 engages or disengages the drive motor, as has been described. To the right of the front panel and under the corresponding screen are "on"-"off" switches 41 and 42 for the projection lamps 35, 35'. Manipulation of these switches allow either picture from the films to appear on the screens, or, with both switches "on," for both pictures to appear. The latter condition is usually employed in editing A and B rolls of film.

Similarly, sound volume controls are positioned under each screen. These are represented in FIG. 2 by knobs 43 and 44 attached thereto. By these controls the sound from one or both tracks can be presented, and at a volume level suited for the work at hand. Typically, for simplicity, one amplifier is employed and it feeds the one loudspeaker previously described, the sound volume controls being effective for channel and level control prior to overall amplification by the one amplifier.

The numerals and radial lines upon the front face of sprocket 4 correspond to the individual frames of 16 mm. film passing thereon. These are arranged counter-clockwise from one to forty and are of assistance in film editing. Among other things, these numerals give equivalent frame positions of the two aligned films on the two sprockets 4 and 4'. These sprockets are disposed sufficiently high with respect to the upper edge of case 1 so that substantially half of the large sprockets can be seen from the usual position of the editor working with the viewer.

FIG. 3 is a complete schematic showing of one of the dual optical systems of the high screen embodiment of FIGS. 1 and 2. The initial optical elements are as has been shown and described in connection with FIG. 2; that is, lamp 35, condenser lens 36, film F-F', rotating prism 6, projection lens 37, shelf prism 38, and first surface mirror 39. A second first-surface mirror 50 is positioned at approximately a 45° angle to the path of film F-F' in order to reflect the image-bearing rays toward the rear of the viewer. Third first-surface mirror 51 is inclined at approximately a 45° angle to the horizontal in order to reflect the rays upward within enclosure 32 of FIG. 1, and fourth first-surface mirror is similarly but oppositely inclined in order to reflect the rays horizontally and forwardly to screen 31. Prism 38 and mirrors 51 and 52 are required to provide a properly oriented picture on screen 31 in its high and rearward position on the viewer.

The optical system for film F''-F''' is the same as that described above, with only the exception of nominally different placement of the elements within the viewer and slightly different inclination of the first-surface mirrors.

With the alternate arrangement employing an Amici type prism instead of the shelf type 38, mirror 39 is removed from its position shown in FIG. 3 and is interposed between mirrors 51 and 52. The Amici arrangement prevents keystone distortion of the image on the screen. The surfaces of mirrors 39, 51, 52 and the screen 31 are all disposed parallel, one to the other. However, the amount of keystoning with the shelf prism is slight and is not noticeable in ordinary editing.

FIG. 4 shows a structurally fragmentary but optically schematic complete view of an alternate embodiment of the motion picture viewer in which the viewing screens are located relatively low in the structure; on the front panel of case 1.

The initial optical elements are as has been shown and described in connection with FIG. 2; that is, lamp 35, condenser lens 36, film F-F', rotating prism 6, and projection lens 37. However, with these low screens shelf prism 38 is not required. Mirror 45 is the equivalent of prior mirror 39. A second first-surface mirror 46 is all that is required to reflect the picture to translucent sceen 47. Only the forward optical system is shown in FIG. 4. The other optical system, terminating at screen 48, is the equivalent thereof. Only slightly different placement of the elements, notably the second first-surface mirror, so that the image therefrom will impinge upon screen 48 rather than upon screen 47.

Figure 5:
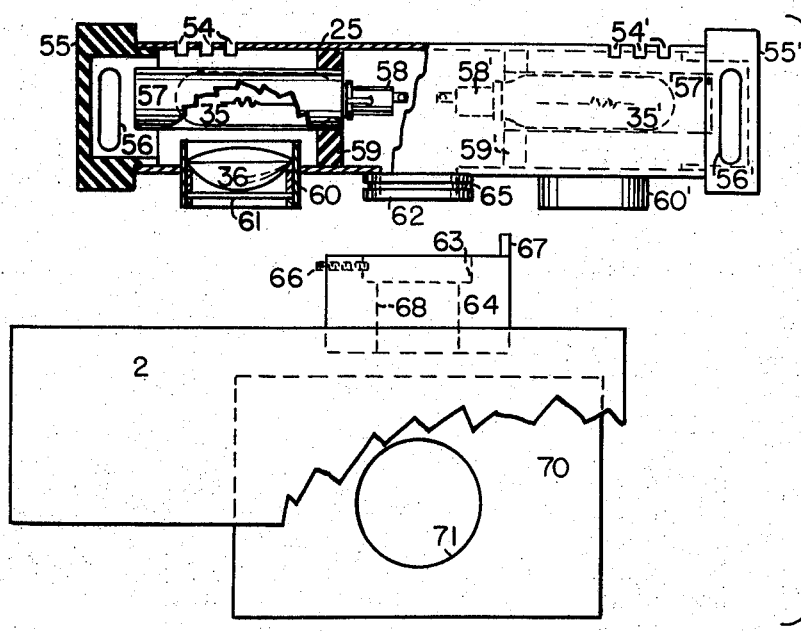
FIG. 5 is a detailed showing of the swivel lamphouse.

FIG. 5 is an exploded elevation view of the swivel lamphouse. The top portion shows the rotatable lamphouse itself, while the bottom portion shows the coacting stationary support, including a rotational stop and a required air-cooling-blower.

Lamphouse 25 is typically a hollow tube of square cross-section, as extruded tubing or sheet metal. It is sufficiently long to house a pair of lamps 35 and 35' and associated elements to illuminate the two films F-F' and F''-F'''. It has certain cooling slots 54 and 54' over each bulb assembly, and also insulating ends 55 and 55', for which Teflon is a suitable material. These the film editor may grasp to turn the lamphouse from its operating position 25 in FIG. 1 to its non-operating or threading position $25_1$. While the lamphouse does not become hot enough to burn an operator's fingers it does become warm. The white Teflon ends of the normally black-anodized lamphouse are a ready visual indicator to the editor as to where the ends of the lamphouse are located. In his normal work with the viewer the editor's attention is concentrated on the film involved and he swivels the lamphouse in a somewhat subconscious manner. Each end has a relatively large exhaust aperture, as 56 and 56', at each side for existing the warmed flow of cooling air originating at the blower. The Teflon ends are a force-fit into the lamphouse and may be pulled out for replacing the illuminating lamps.

Each lamp, 35 and 35', is housed within a somewhat close-fitting housing or baffle, 57 and 57', having lamp sockets 58 and 58' mounted to the housing so that an adequate flow of air from the blower enters the housing at the socket end and departs at the opposite open end. The lefthand side of the lamphouse and the housing are both broken away in FIG. 5 to reveal this construction. Each housing is supported within the lamphouse by a square support 59, located at the socket end of the housing. Besides supporting housing 57 it requires that the stream of cooling air pass within the housing close to the lamp rather than outside of the housing.

Considering one of the two optical systems, aligned between the filament of lamp 35 and film F-F' is condenser lens assembly 60. This includes unsymmetrical condenser lens 36, typically having a diameter of 30 mm. and a focal length of 15 mm. Below this lens there is preferably placed a diaphram of heat-absorbing glass 61. In editing, the film is often translated slowly or even stopped for considerable periods of time (from seconds to minutes). Thus, heat sufficient to damage the film must be removed from the illuminating rays and glass 61 accomplishes this. Condenser lens assembly 60', the same as 60, is provided for the second film path.

Swivel flange 62 is centrally affixed to the bottom of lamphouse 25. This flange forms a bearing for rotation of the lamphouse in combination with recess 63 in stationary swivel-block 64. Circumferential groove 65 is located essentially midway along flange 62. After the flange is seated in the recess setscrew 66 is screwed inwardly to engage the groove, thereby retaining the flange in the recess.

Stop 67 is fastened to swivel-block 64 at one corner thereof and projects upwardly. This engages the side of lamphouse 25 at the ends of 90° rotation. The stop is positioned so that the end position over the film paths is exactly 90° for purposes of accurate alignment, whereas the opposite end position may be a few degrees short of a full 90°, but sufficient to be out of the way for threading the film paths.

Flange 62 is hollow, having a relatively large centrally located hole. This mates with a similar concentric orifice 68 in swivel-block 64, below which cooling air blower 70 is positioned. The swivel block is mounted between and fastened to the two parts of inner metal frame 2, 2'. Blower 70 is similarly disposed and fastened, and has inlet orifice 71 centrally located on each of its vertical sides. The exhaust orifice of the blower mates with that 68 in the swivel-block. Blower 70 is thin horizontally and is a commercially available device. It is powered by a small electric motor.

Thus, there is provided an air cooling path starting with inlet orifice 71, passing through orifice 68, hollow flange 62, the central volume of lamphouse 25, between lamps 35 and 35' and enclosures 57 and 57', and out through apertures 56 and 56' in ends 55 and 55'.

Figure 6:
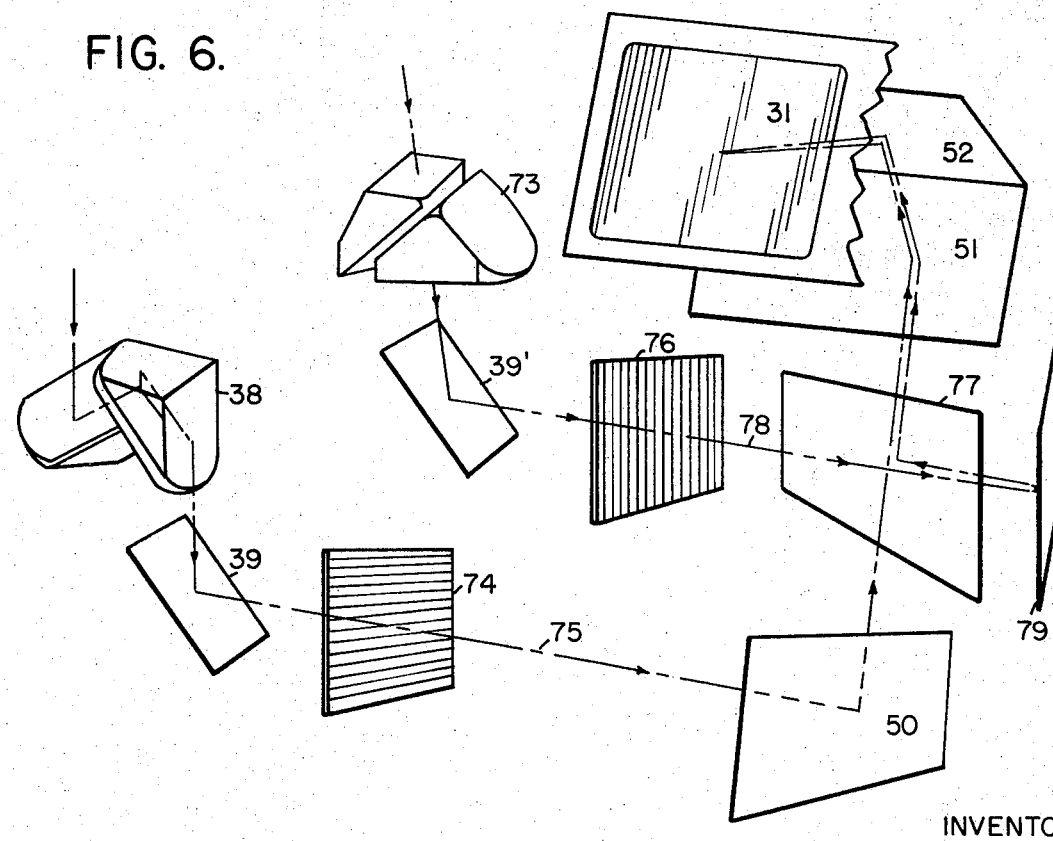
FIG. 6 is a schematic showing of the 3D optical system.

FIG. 6 is a fragmentary schematic showing of the terminal portion of two optical systems according to this invention by means of which stereoscopic ("3D") images may be exhibited on a single viewing screen.

The initial parts of the two optical systems are the same as previously shown and described in connection with either of FIGS. 2 or 3; i.e., lamps 35 and 35', condensing lenses 36 and 36', film F–F' carrying one of the stereo pictures, film F''–F''' carrying the other, and projection lenses 37 and 37'.

Continuing, in FIG. 6, the forward optical system includes shelf prism 38 and first first-surface mirror 39 as has been previously shown. The rear optical system; however, has a Pechan, or Dove type, prism 73 taking the place of the previous shelf type prism. This substitution is required because the additional reflection of mirror 79 of this optical arrangement reverts the image in the rear optical path. Thus, either one more or one less reflections is required to prevent the reversion from appearing on the screen. In FIG. 6 one less reflection has been chosen.

An alternate arrangement employs an Amici type prism at 38. In this case no prism is required at all at 73. Mirror 39' is sufficient to provide the correct number of reflections.

Sheet 74, perpendicular to optical axis 75, is typically of Polaroid polarizing optical material and horizontally polarizes the light which passes through it. Similarly, sheet 76 is the equivalent, but turned 90° so as to vertically polarize the light which passes through it. While horizontal and vertical polarization is typical there is no reason why the planes of polarization may not be oblique as long as they are at 90°, one to the other.

Element 77 is a thin (0.005") first surface half-silvered mirror. It serves two purposes. The first is to transmit (half) of the light traveling along axis 75, as reflected from prior second first-surface mirror 50, to prior mirrors 51 and 52 and thence to translucent screen 31. The second purpose is to similarly pass half of the light traveling along axis 78. This light then impinges upon fully reflecting first-surface mirror 79, is reflected back to the rear surface of mirror 77, is reflected therefrom, and thence to mirrors 51 and 52, and to screen 31.

The purpose of mirror elements 77 and 79 is to extend optical path 78 to equal the longer optical path 75. By including a known translational adjustment to mirror 79, to move it toward and away from mirror 77, adjustment of the two path lengths can be made for attaining equality. This results in images from both films of equal size upon screen 31. Angular adjustment of mirror 50 in both dimensions allows superimposition of both images upon the screen. By a person viewing with known polarized glasses, vertical polarization for one eye and horizontal polarization for the other, a stereoscopic picture is seen.

Substitutionally, sheet 74 may be a cyan gel and sheet 76 a magenta gel, with corresponding colors in viewing glasses.

Without these sheets, or without corresponding viewing glasses, fade-in-fade-out effects can be arranged between two films by providing electrical or other controls upon lamps 35 and 35'.

A single viewer according to this invention can be substitutionally employed for either two track editing or for two track stereoscopic viewing by arranging for the substitution of prism 38' for prism 73, removal of polarizing sheets 74 and 76 (or ignoring the polarization produced thereby), and removing mirrors 77 and 79 and replacing these with mirror 50' at a different location to provide two pictures on two screens as indicated in FIG. 2. These substitutions can be arranged with slip-in and lock mountings, so that they can be relatively rapidly and accurately accomplished.

Also, if reproduction of stereoscopic pictures from a single film F–F' having double-rank (side-by-side) exposures upon it, this viewer may be used if two rhomboidal prisms are employed at right-angles to the film plane. This achieves separation of the image paths so that the previously described optical paths may be employed.

By providing an additional film path three sound tracks and two pictures may be heard and seen simultaneously. The third sound track is placed at the front of the viewer, with a third 40 frame sprocket placed on shaft 10 and handwheel 20 moved forward. A third sound head, as 16, is also forwardly provided, including guide rollers as before. An additional sound mixing control, as 43, is also provided, by means of which the third sound track can be reproduced with the other sound tracks through the single amplifier and loudspeaker. This construction is an extension of the teaching of the dual film path apparatus previously illustrated.

While an embodiment suited for 16 mm. film has been described, alternate embodiments for super-8, eight, or 35 mm. film may be constructed by understandable modification of principally film path dimensions.

I claim:

1. A unitary portable dual motion picture viewer comprising;
   (a) a pair of film paths (F–F' and F''–F'''), including aligned synchronized drive sprockets (4, 4') to carry each of a pair of films in the same position as in a projector,
   (b) a dual lamp in-line uniaxial lamphouse (25), with means (41, 42) to individually energize each lamp, centrally pivotally mounted between said synchronized drive sprockets,
      having a retracted position ($25_1$) horizontally removed from said film paths to allow threading film in said film paths, and an operating position (25), for selectively separately illuminating each said film,
   (c) dual optical paths (25, 75, 31 and 25, 75', 30), including a shelf-type prism, originating at said lamphouse and terminating at at least one viewing screen (30, 31) mounted upon said portable viewer, and
   (d) dual aligned sound reproducing heads (16, 16') in said pair of film paths,
      whereby dual picture and sound reproduction may be adjacently exhibited from films that are moved in said pair of film paths.

2. The viewer of claim 1 which additionally includes;
   (a) a single positioning stop (67) spatially related to said lamphouse to selectively stop said lamphouse with respect to said film paths in an operating position (25) to illuminate film in said film paths, and
      to further selectively stop said lamphouse in a threading position (25') away from said film paths,
      to allow threading film in said film paths.

3. The viewer of claim 1 in which each dual optical path includes in order;
   (a) one lamp (35 or 35') of said dual lamp lamphouse,
   (b) film in projection position in one of said film paths
   (c) a multi-faced rotatable prism (6) adjacent to said film path,
   (d) a projection lens (37),
   (e) a shelf-type prism (38),
   (f) a first mirror (39),
   (g) a second mirror (50)
adjustable in position for selectively superimposing images from both optical paths, (h) a third mirror (51),
   (i) a fourth mirror (52), and
   (j) a viewing screen.

4. The viewer of claim 1 in which;
 (A) one (75) of said dual optical paths includes,
  (a) inverting and reverting optical means (38), and
  (b) means (74) for imparting a unique characteristic to the light traversing said one optical path, and
 (B) the other (78) of said dual optical paths includes,
  (a) reverting optical means (73 or 39'),
  (b) further means (76) for imparting a different unique characteristic to the light traversing said other optical path,
  (c) a half-silvered mirror (77), and
  (d) an additional mirror (79)
positioned to reflect light traversing said other optical path back to said half-silvered mirror,
 whereby a superimposed image having the unique characteristics of each optical path is formed upon a single screen (31).

5. The viewer of claim 4 in which;
 (a) the unique characteristic of each of the optical paths is polarization of the light traversing the same in planes at substantially right angles, one to the other.

6. The viewer of claim 4 in which;
 (a) the unique characteristic of each of the optical paths is the passage of light of complementary colors for impingement upon said single screen (31).

References Cited

UNITED STATES PATENTS

| | | | |
|---|---|---|---|
| 3,529,147 | 9/1970 | Badalich | 352—198 X |
| 3,507,569 | 4/1970 | Goto | 352—119 X |
| 3,516,738 | 6/1970 | Wells | 352—119 X |
| 3,552,842 | 1/1971 | Taillon | 352—133 X |
| 3,379,488 | 4/1968 | Lancor | 352—133 X |
| 3,271,097 | 9/1966 | Montremy et al. | 352—133 X |
| 3,273,449 | 9/1966 | Foral | 352—133 X |
| 3,446,549 | 5/1969 | Husted | 352—129 X |
| 2,905,050 | 9/1959 | Castedello et al. | 352—129 X |
| 3,155,979 | 11/1964 | Mast et al. | 352—119 |
| 3,459,472 | 8/1969 | Husted et al. | 352—129 |
| 3,506,343 | 4/1970 | DeJoux | 352—133 X |
| 3,602,583 | 8/1971 | Torricelli | 352—133 X |

FOREIGN PATENTS

| | | | |
|---|---|---|---|
| 1,461,676 | 11/1966 | France | 353—129 |
| 909,001 | 11/1945 | France | 353—59 |

SAMUEL S. MATTHEWS, Primary Examiner

A. MATHEWS, Assistant Examiner

U.S. Cl. X.R.

352—59, 119, 133, 198